United States Patent
Gorthala

(10) Patent No.: US 6,299,317 B1
(45) Date of Patent: Oct. 9, 2001

(54) METHOD AND APPARATUS FOR A PASSIVE SOLAR DAY LIGHTING SYSTEM

(75) Inventor: Ravi Gorthala, 126 Clear Vista La., Asheville, NC (US) 28805

(73) Assignees: Ravi Gorthala, Asheville, NC (US); Steven Winter Associates, Inc., Norwalk, CT (US)

( * ) Notice: Subject to any disclaimer, the term of this patent is extended or adjusted under 35 U.S.C. 154(b) by 0 days.

(21) Appl. No.: 09/459,464

(22) Filed: Dec. 13, 1999

(51) Int. Cl.$^7$ ............................................. G02B 5/10
(52) U.S. Cl. ..................... 359/853; 359/869; 359/591; 359/593
(58) Field of Search ................... 359/851, 853, 359/868, 869, 591, 592, 593, 594, 595, 597, 598; 136/246

(56) References Cited

U.S. PATENT DOCUMENTS

| | | | |
|---|---|---|---|
| 4,511,755 | * 4/1985 | Mori | 136/246 |
| 5,243,459 | * 9/1993 | Winston et al. | 359/362 |
| 5,357,101 | * 10/1994 | Plesko | 250/216 |
| 6,037,535 | * 3/2000 | Yoshino | 136/246 |

* cited by examiner

Primary Examiner—Cassandra Spyrou
Assistant Examiner—Mark A. Robinson
(74) Attorney, Agent, or Firm—Crowell & Moring LLP

(57) ABSTRACT

A method and apparatus for a passive, fiber-optic day-lighting system collects and transports sunlight as a cost-effective technology solution for day-lighting applications. The system utilizes a low concentration ratio sunlight collection system, in expensive optical fibers, and an inexpensive passive solar thermal tracker. The sun-light collection system uses an array of conical compound parabolic concentrators with concentration ratio in the range of 50–500. The sun-light collection system may also use an array of square or rectangular shaped Fresnel lenses with circular concentric grooves. The array of Fresnel lenses can be formed on a single sheet of plastic, which will minimize the cost of manufacturing and reduce the cost of assembly of individual lenses into an array. The sun-light collection may also use arrays of two concentrators in tandem.

13 Claims, 5 Drawing Sheets

METHOD AND APPARATUS FOR A PASSIVE SOLAR DAY LIGHTING SYSTEM

BACKGROUND OF THE INVENTION

1. Field of the Invention

The present invention is directed to a method and apparatus for a passive solar day lighting system using sunlight transported into a structure through an optical conduit. More particularly, the present invention is directed to a passive lighting system that does not require active tracking of the sun and utilizes non-imaging optical collectors for concentrating collected sunlight and optical fibers for transporting light to a light fixture in a room.

2. Description of Prior Art

The use of natural light in buildings can significantly reduce the energy consumption and improve the quality of life. But interior rooms cannot benefit from a window or a sky light and only rooms immediately below a roof can enjoy a skylight. There have been several efforts to capture sunlight and deliver it to remote parts of buildings using fiber optics or light pipes or optical conduits.

Many of these previous efforts used some type of active sun tracking system coupled with complicated lens and mirror systems. For example, U.S. Pat. Nos. 4,246,477; 4,297,000 and 4,409,963 disclose various sunlight collectors, containing Fresnel lens systems. The collectors are mounted on the roof of a building and actively track the sun during daylight hours.

Other systems for collecting and transporting sunlight are disclosed in U.S. Pat. Nos. 4,307,936; 4,541,414; 4,539,625; 5,548,490 and 5,709,456. These patents disclose various devices to collect sunlight without actively tracking the sun. The U.S. Pat. Nos. 4,307,936 and 4,541,414 are directed to sunlight collecting devices that use a parabolic collector to capture sunlight and a complex arrangement of lenses to concentrate the captured sunlight. The U.S. Pat. Nos. 4,539,625; 5,548,490 and 5,709,456 are directed to large stack luminescent or fluorescent sheets arranged to collect sunlight and convert that collected light into concentrated light.

Some of these approaches have used complex, delicate systems that track the sun actively. The other systems, require either complicated mirror and lens assemblies or specialized glass collectors having luminescent or fluorescent dyes therein, making the systems so expensive that they cannot be justified by the electric energy it saves.

Passive solar tracking systems are known in the prior art. These passive tracking systems generally use solar thermal energy to track the sun's path. Solar thermal powered tracking systems are described in U.S. Pat. Nos. 4,332,240; 4,262,654; 5,600,124; 4,175,391; 4,275,712; 4,306,541 and 4,476,854. In each of these patents, a parabolic trough collects solar energy and heats fluid-containing reservoirs to cause differential vaporization and shifting of fluid to rotate the apparatus. These passive tracking systems offer a cheaper means for tracking the sun, however, the size of the collectors renders them generally unsuitable for a large scale device.

SUMMARY OF THE INVENTION

The present invention contemplates a simple sunlight collection system based on the premise that the cost of collecting and transporting sunlight should be low. Therefore, a high-precision tracking feature is not part of the present invention. Important elements required for a day-lighting system are the means to collect sunlight and the means to transport the collected light to the building interior space. The present invention is a passive system without active tracking of the sun and utilizes well established non-imaging optical collectors for concentrating the sunlight and optical fibers for transporting light to a light fixture in a room. The use of optical fibers (plastic or comparatively less expensive glass) that are flexible, minimizes cost of installation in comparison to light pipes or other optical guides.

To meet these and other objectives, the present invention is directed to a passive solar day-lighting system using a low light concentration ratio sun-light collection system. The collection system includes an array of non-imaging concentrators housed in an enclosure with at least one transparent surface. The sun-light collection system is mounted on a passive solar thermal tracking system and is connected to an optical conduit which transports collected and concentrated light from the sun-light collection system to an interior building space.

The solar collector system as contemplated in the present invention has a low light concentration ratio of at least 50, and no greater than 700. The concentration ratio or factor is the ratio of the inlet area to the exit area of the collector. The higher the concentration ratio, the lower is the half-angle of acceptance and hence the higher is the precision required for tracking the sun. Because the array of non-imaging concentrators has a relatively low concentration ratio, the system does not require precision tracking.

In certain preferred embodiments of the invention, the array of non-imaging concentrators is a plurality of conical compound parabolic concentrators, each of the concentrators having a predetermined input half-angle and a predetermined exit-half angle. Each of the plurality of conical compound parabolic concentrators also has a predetermined input diameter and a predetermined exit diameter, and the sun-light collection system is designed by optimizing the predetermined input half-angle, the predetermined exit-half angle, the predetermined input diameter, and the predetermined exit diameter of each of the plurality of conical compound parabolic concentrators.

In certain preferred embodiments of the invention, the array of non-imaging concentrators alternatively is an array of Fresnel lenses of square or rectangular shape, and may be manufactured singly or on integrally on a single sheet of plastic. It is also contemplated that the array of non-imaging concentrators may be comprised of a plurality of sets of two concentrators in tandem with a Fresnel lens as a primary concentrator and a conical compound parabolic concentrator as a secondary concentrator.

The optical conduit according to certain preferred embodiments of the present invention is a series of optical fibers coupled to exit ends of each non-imaging concentrator. The optical fibers can be made of a plastic material or an inexpensive glass.

The passive solar thermal tracking system contemplated by certain preferred embodiments of the invention includes a non-electric tracking device that uses solar thermal energy to power a device to move the collector thereby tracking sun movement. The contemplated solar thermal tracking system should have an inaccuracy of no more than 5° while tracking the sun. This requires a half angle of acceptance of no more than 5° for the primary collector.

The present invention is also directed to a method for passively supplying sunlight to a day-lighting system. The contemplated method includes forming a low light concentration ratio sunlight collection system by arranging an array of non-imaging concentrators, each having an input end and an exit end in an enclosure with at least one transparent surface. The method also includes mounting the array of non-imaging concentrators on a passive solar thermal tracking system.

Preferred embodiments of the method according to the invention further include connecting an optical conduit to each exit end of the array of concentrators, and passively tracking the sun using the solar thermal tracking system, thereby collecting sunlight in the array of non-imaging concentrators. The method further contemplates transporting the collected sunlight through the optical conduit to an interior portion of a structure.

The significance of passive solar powered tracking system is it does not require external power and it is less costly than powered active systems. Another advantage is solar powered tracking systems is proven and is commercially available for photovoltaic applications (e.g., from Zome Works Corp. Albuquerque, N. Mex. 87125). With existing controls, electric lighting can be easily integrated with the day-lighting based on the present invention, and can be controlled based on sensed lighting level in a room. This assures un-interrupted, desired lighting level in the interior building spaces during cloudy periods.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof which makes reference to the annexed drawings wherein.

DETAILED DESCRIPTION OF THE DRAWINGS

Figure 1:
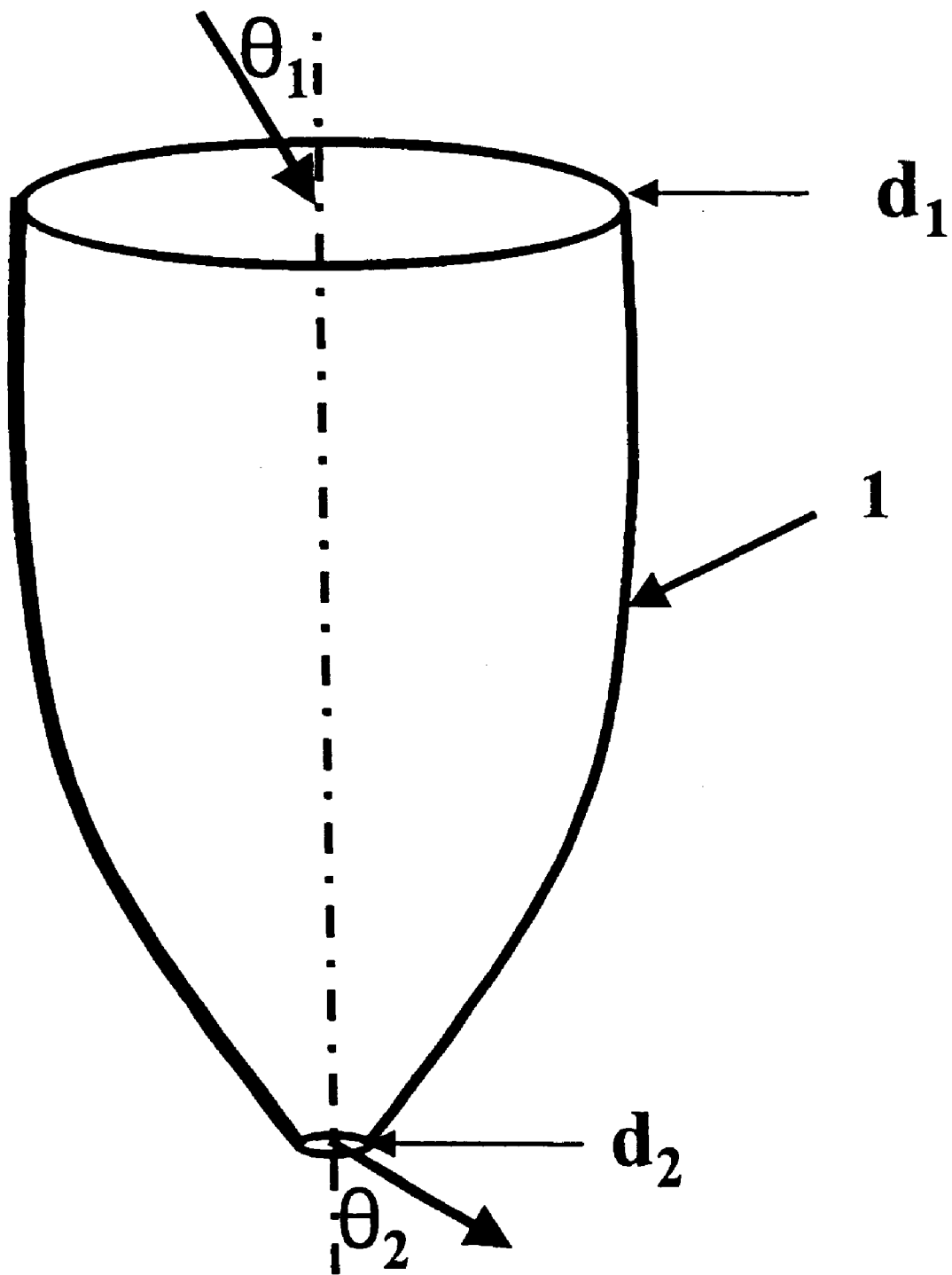
FIG. 1 illustrates a schematic of a typical conical compound parabolic concentrator (CPC), contemplated for use with preferred embodiments of the invention.

The first component of the present invention is the concentrator. FIG. 1 illustrates a non-imaging concentrator according to one aspect of the present invention. FIG. 1 illustrates a conical compound parabolic concentrator 1 (CPC). The conical CPC contemplated in the present invention is not a trough-type collector. Rather, the conical CPC of the present invention has specified inlet and exit half-angles, $\theta_1$ and $\theta_2$ respectively, as seen in FIG. 1. The CPC 1 can be reflective and can be filled with a dielectric medium or it can be dielectric totally internally reflective. The maximum concentration ratio or factor, C, for such a CPC concentrator is given by the expression:

$$C=(n_2 \sin(\theta_2)/n_1 \sin(\theta_1))^2=(d_1/d_2)^2 \quad (1)$$

where, $n_1$ and $n_2$ are the refractive indices of the mediums at the inlet and the exit; and $d_1$ and $d_2$ are the inlet and out diameters of the concentrator.

If the exit half-angle, $\theta_2$ is less than 90°, the device is typically referred to as a $\theta_1$–$\theta_2$ transformer. However, the term concentrator will be used throughout the following description instead of the term transformer. Since the present invention utilizes fiber-optic cables to transport sunlight form the concentrator, the required exit angle (half-angle) of the CPC concentrator is determined by the half-acceptance angle of the optical fiber. The half-acceptance angle for current fibers for lighting application are in the range of 30° to 40°. Then, the concentration ratio or factor is dictated by the inlet angle, i.e., the larger the inlet angle, the smaller is the concentration factor. For instance, if the inlet and exit angles are 5° and 40° respectively, then the concentration factor is about 54, assuming $n_1$ and $n_2$ to be 1.

The present invention stems from the fact that low concentration ratios can accommodate higher acceptance angles and hence lower precision for tracking the sun. Therefore, a high precision active tracking control is not required. The present invention, thus, takes advantage of the existing passive solar thermal tracking with less precision in tracking the sun. The advantages of passive solar thermal tracking are: it uses solar energy; no external power is required; no motors are required; and it is therefore less expensive than active tracking systems. Currently, single-axis passive trackers are available on the market for photovoltaic application. Zome Works Corp. of Albuquerque, N. Mex. 87125 markets Universal Track Racks that could be utilized. The present invention can use such a tracker, but preferably uses dual-axis tracking since tracking of the sun during the course of the day as well as during the course of changing seasons is desired. Since the focus of the present invention is on the overall system development and not on individual components, the passive tracker principle and construction of the same are not discussed here. Those skilled in the field can easily construct a dual-axis passive tracker. Descriptions of various solar thermal powered trackers can be found in U.S. Pat. Nos. 4,332,240; 4,262,654; 5,600,124; 4,175,391; 4,275,712; 4,306,541; and 4,476,854, the disclosures of which are herein incorporated by reference.

Figure 2:
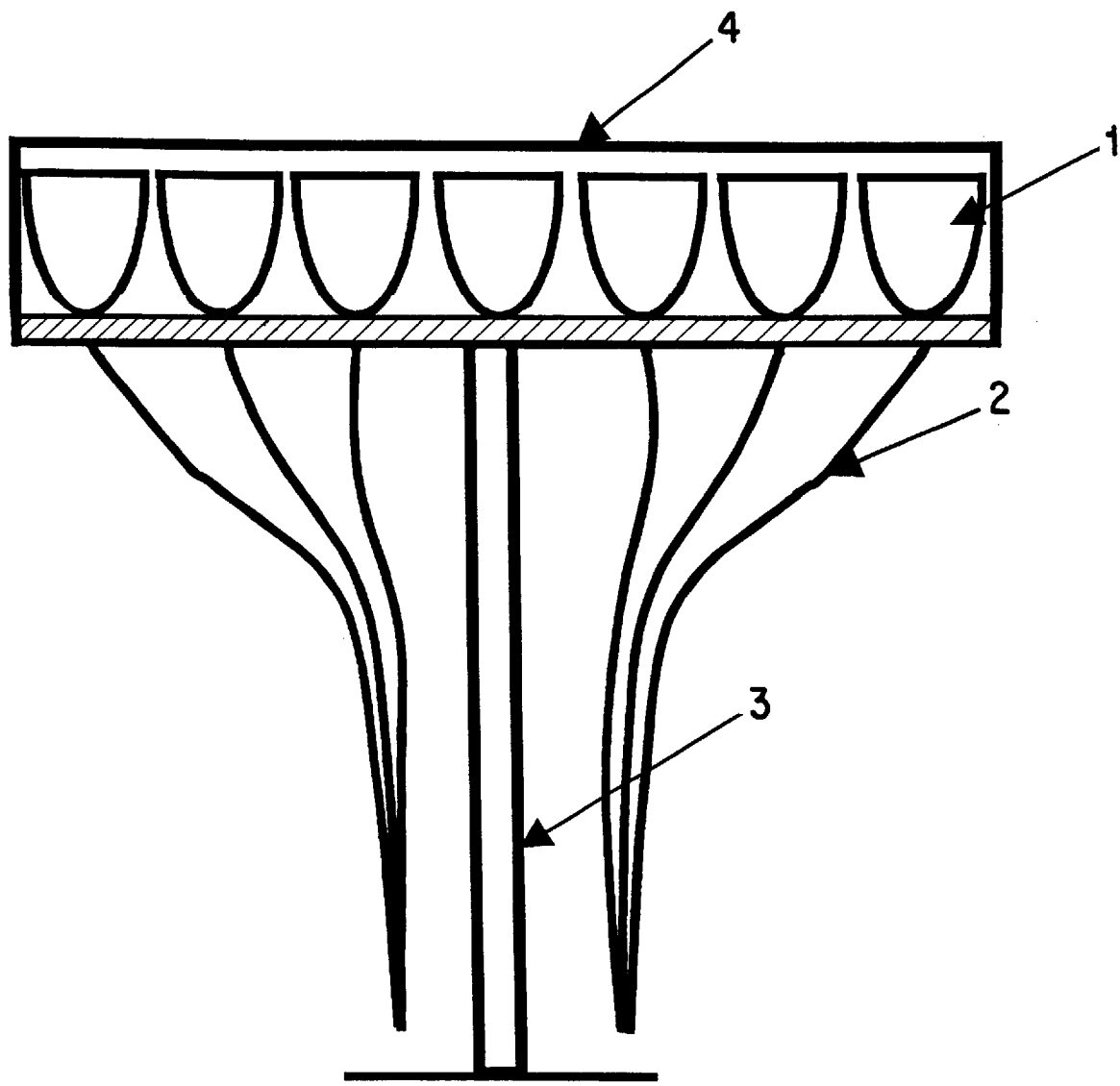
FIG. 2 is a schematic depiction of a fiber-optic daylighting system with CPCs contemplated for use with preferred embodiments of the invention.

FIG. 2 illustrates a schematic of the fiber-optic daylighting system according to one embodiment of the present invention. As shown in FIG. 2, the fiber optic day-lighting system includes a passive solar thermal tracker 3, on which a housing 4 is rotatably mounted. The housing 4 comprises an array of CPCs 1. Each of the CPCs 1 is connected to an optical fiber 2. The optical fibers 2 can be bundled into one or more bundles depending upon their destination, i.e., whether the whole bundle is delivered to a single light fixture or multiple light fixtures within the interior building space. An example of the low concentration fiber-optic day-lighting system is presented below:

Assumptions:

Incident solar input=9100 lumens/ft$^2$

Accuracy of the passive tracker: $\theta_1$=3°
(the-half angle of acceptance)

Overall system efficiency=30%

Desired output at the fiber-end=5000 lumens

Fiber half-angle of acceptance: $\theta_2=40°$

Fiber diameter: $d_2=0.5"$
  (Exit diameter of the concentrator)

Calculations:

Area of the collector required=$5000/(9100\times0.3)=1.83$ ft$^2$

Concentration ratio: C=150
  (from Eq. (1): $C=(d_1/d_2)^2=150$)

$\therefore d_1$ (inlet diameter of the concentrator)=6.12"

Number of concentrators=Area required/area of each concentrator=$1.83\times144$ in$^2/(n\times d_1^2/4)=9$ The above calculations illustrate that 9 CPCs are required for delivering an output of 5000 lumens. The length or height of the CPC in this case is estimated to be 63", which is rather high for practical construction. However, there are several strategies to bring the CPC height into practical magnitude. If the number of CPCs is increased to 20 (by decreasing $d_1$ and $d_2$) for example, the CPC height can be reduced to 42". Further, the CPC can be truncated without significant loss in collection efficiency. From the above discussion it should be evident that an optimized sun-light collection system can be designed and developed by optimizing the parameters $\theta_1$, $\theta_2$, $d_1$, $d_2$, and the system efficiency.

Figure 3:
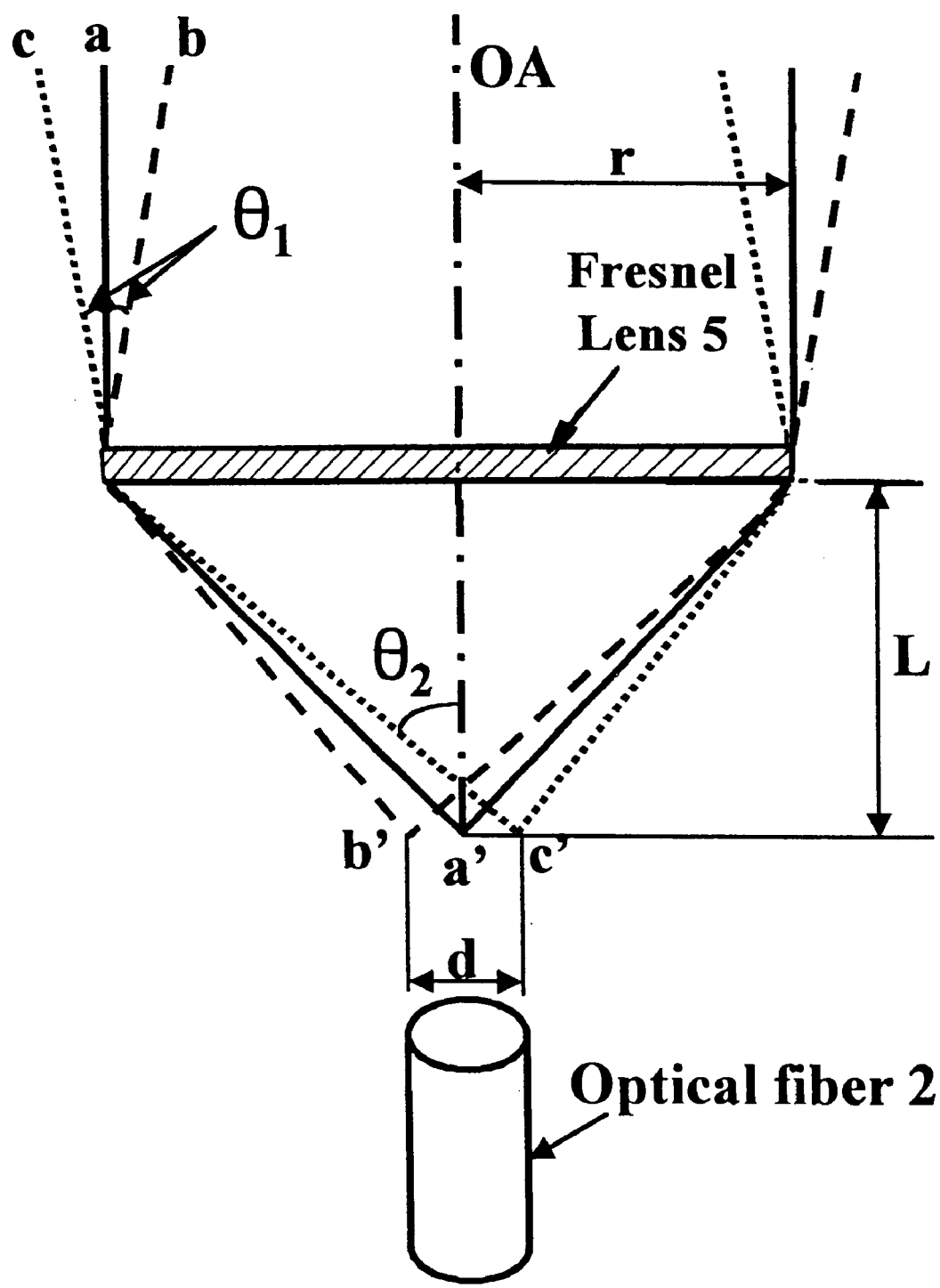
FIG. 3 shows a representation of a Fresnel lens that is used in preferred embodiments of the system according to the present invention.

FIG. 3 illustrates a further embodiment according to the invention that utilizes Fresnel lenses instead of CPCs but still employs the solar thermal passive concentrator. FIG. 3 shows a schematic of a Fresnel lens 5 with incident light rays a, b, and c wherein light ray a is parallel to the optic axis OA. The focal point for rays parallel to the optic axis is a'. The off-axis rays b and c (at an angle of $\pm\theta_1$ to the optic axis) focus at b' and c', respectively. The angle, $\theta_1$, is the half-angle of acceptance of the Fresnel lens and the precision of the passive tracker in tracking the sun. As shown in FIG. 3, r is the radius of the Fresnel lens and L is its focal length. Also, d is the minimum diameter of the optical fiber 2 needed to accept sun-light at an angle of $\theta_2$. Since the cost of the optical fiber is a driving factor in the design of the overall system, the diameter of the fiber, d, and the number of fibers should be minimized by optimizing r, L, $\theta_1$ and $\theta_2$.

Figure 4:
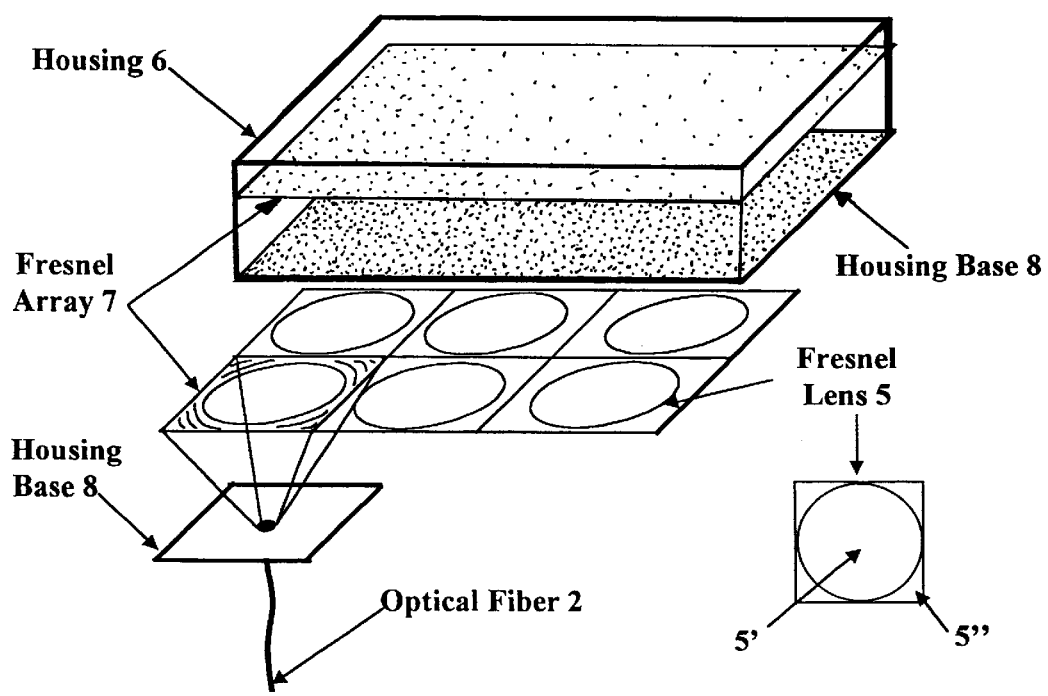
FIG. 4 shows details of a Fresnel lens sunlight collection system used in certain preferred embodiments of the present invention.

It is not practical to utilize a single Fresnel lens for collecting sun-light to a level for practical use. Therefore, an array of Fresnel lenses is needed. U.S. Pat. No. 4,409,963, the disclosure of which is herein incorporated by reference, discloses an ideal arrangement of Fresnel lenses. In the '963 Patent, each Fresnel lens has a hexagonal shape and the lenses are arranged around one lens in a concentric circular form. Since cost is an important issue, the present invention provides an alternate, cost-effective shape and arrangement of Fresnel lenses. As shown in FIG. 4, the preferred shape of Fresnel lens 5 according to the invention is a square (or a rectangle). The maximum circle 5' size that can be inscribed on a square is shown in FIG. 4. The remaining area of the square 5" may be unutilized.

According to the present invention concentric grooves can be cut in this area 5" so that this area also can be utilized to concentrate sun-light. It is not difficult to manufacture square or rectangular Fresnel lenses and such lenses are currently manufactured by Fresnel Optics, 1300 Mt. Reed Blvd., Rochester, N.Y. 14606. These individual square or rectangular Fresnel lenses can be assembled into an array. However, an integral Fresnel array 7 of such square lenses can be manufactured in one step by employing existing manufacturing processes. This approach will eliminate the costs associated with assembling individual lenses into an array.

Since there will be a limitation on size of the largest single array that can be manufactured, a modular approach is utilized according to certain contemplated embodiments of the invention. For example, an array of 2 feet by 3 feet with twelve 6-inch square Fresnel lenses can be one module. Depending upon the light collection area required, multiple lens modules can be manufactured. These modules can be enclosed in individual housing 6 as shown in FIG. 4 or multiple Fresnel lens modules can be enclosed in a single housing.

FIG. 4 illustrates additional details of Fresnel lens system according to the present invention. Not shown in FIG. 4 is the detail of the fiber optic connector or coupler to connect fiber to the collector housing base 8. There exist commercial connectors and or couplers that can be used for this application and are well known to those of ordinary skill in this art. Additionally, those skilled in the art can design several variations for the connector/coupler.

Figure 5:
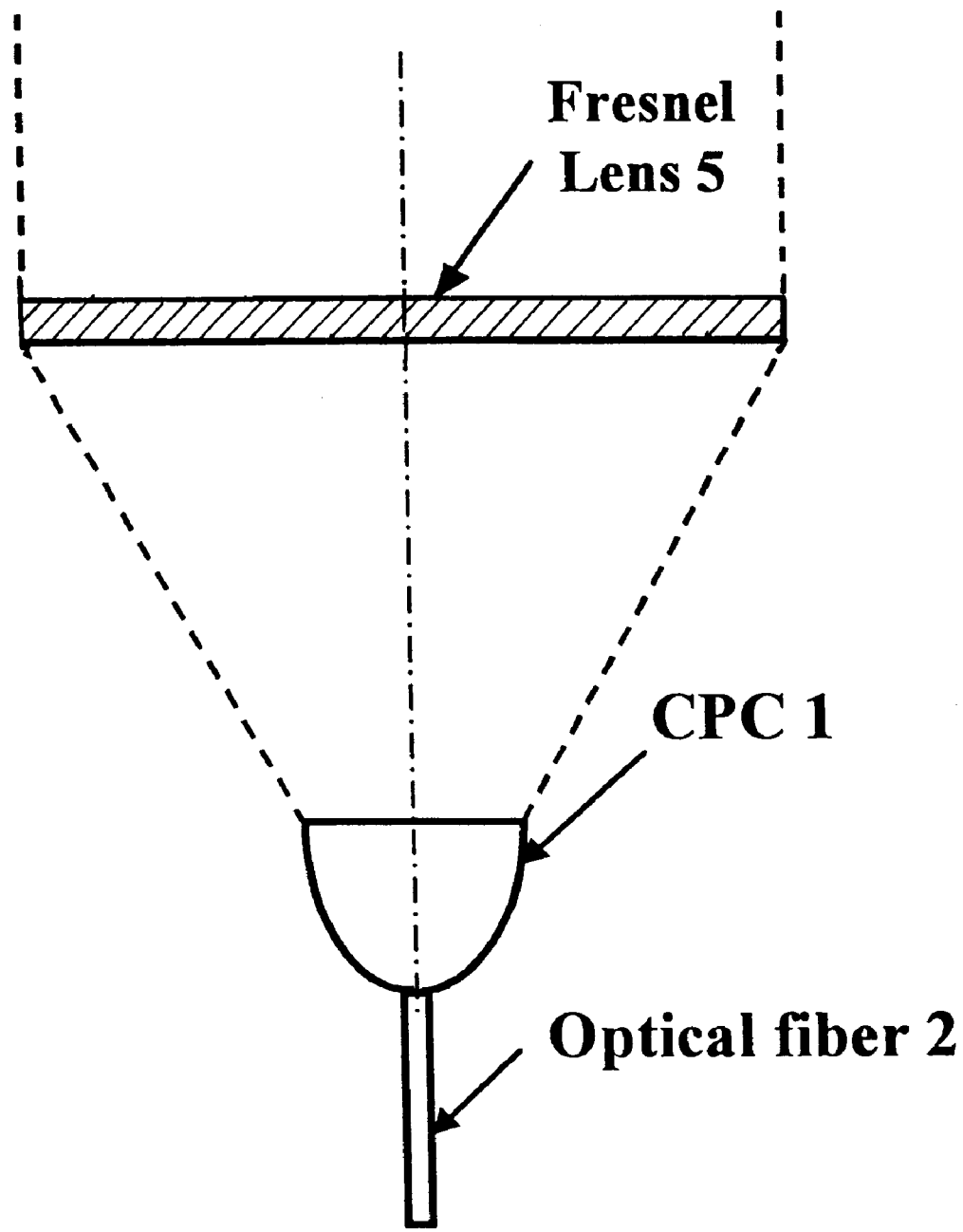
FIG. 5 shows a sunlight collection system with two concentrators in tandem constructed in accordance with preferred embodiments of the present invention.

Yet another embodiment of the invention provides that the sun-light collection system is made from two concentrators in tandem, i.e., a primary concentrator and a secondary concentrator are arranged in series. The primary concentrator can be a Fresnel lens and the secondary concentrator can be a CPC or a transformer that is reflective or dielectric totally internally reflective. Such an embodiment is shown FIG. 5. Such a concentrator is disclosed in Applied Optics, Vol. 26(7), pp. 1207–1212, by Xiaohui Ning et al., titled "Optics of Two-Stage Photovoltaic Concentrators with Dielectric Second Stages."

The present invention is also directed to a method for passively supplying sunlight to a day-lighting system. The contemplated method includes forming a low light concentration ratio sunlight collection system by arranging an array of non-imaging concentrators, each having an input end and an exit end in an enclosure with at least one transparent surface. The concentrators may be either the plurality of CPCs described above or the plurality of Fresnel lenses.

The method also includes mounting the array of non-imaging concentrators on a passive solar thermal tracking system. As described above, the passive thermal tracking system uses solar thermal energy to power the tracking device. Although this particular method of tracking sun movement is not as accurate as other actively powered systems, the particular arrangement of low concentration ratio collecting devices permits a less accurate tracking system.

The method further includes connecting an optical conduit to each exit end of the array of concentrators, and passively tracking the sun using the solar thermal tracking system, thereby collecting sunlight in the array of non-imaging concentrators. The method further contemplates transporting the collected sunlight through the optical conduit to an interior portion of a structure and integrating with electric lighting.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A day-lighting system comprising:
   a sun-light collection system including a focusing lens arrangement spaced apart from and coupled with an array of non-imaging concentrators having an input and output diameter and a diameter of each focusing lens of the arrangement being greater than the input diameter of a corresponding one of the concentrators of the array, wherein said focusing lens arrangement and said array of concentrators are housed in an enclosure with at least one transparent surface; and
   an optical conduit to transport light from the sun-light collection system to an interior building space where it can be integrated with electric lighting, wherein the sun-light collection system is mounted on a passive solar thermal tracking system.

2. A passive solar day-lighting system according to claim 1, wherein the array of non-imaging concentrators comprises a plurality of conical compound parabolic concentrators.

3. A passive solar day-lighting system according to claim 2, wherein each of the plurality of conical compound parabolic concentrators has a predetermined input half-angle and a predetermined exit-half angle.

4. A passive solar day-lighting system according to claim 3, wherein each of the plurality of conical compound parabolic concentrators has a predetermined input diameter and a predetermined exit diameter.

5. A passive solar day-lighting system according to claim 4, wherein the sun-light collection system is designed by optimizing the predetermined input half-angle, the predetermined exit-half angle, the predetermined input diameter, and the predetermined exit diameter of each of the plurality of conical compound parabolic concentrators.

6. A passive solar day-lighting system according to claim 1, wherein the optical conduit comprises optical fibers coupled to exit ends of each non-imaging concentrator.

7. A passive solar day-lighting system according to claim 6, wherein the optical fiber is plastic.

8. A passive solar day-lighting system according to claim 6, wherein the optical fiber is low-cost glass.

9. A passive solar day-lighting system according to claim 1, wherein the solar thermal tracking system has an inaccuracy of no more than 5° while tracking the sun.

10. A passive solar day-lighting system according to claim 1, wherein the solar thermal tracking system is a dual-axis solar thermal tracking system.

11. A passive solar day-lighting system according to claim 1, wherein the non-imaging concentrator is a dielectric totally internally reflecting concentrator.

12. A passive solar day-lighting system comprising:
    a sun-light collection system including an array having a plurality of sets of two concentrators in tandem, with a Fresnel lens as a primary concentrator and a conical compound parabolic concentrator as a secondary concentrator, wherein said secondary concentrator has an input end and an exit end wherein the input end has a diameter less than a diameter of said Fresnel lens; and
    an optical conduit to transport light from the sun-light collection system to an interior building space.

13. A method for passively supplying sunlight to a day-lighting system comprising:
    forming a sunlight collection system including a Fresnel lens arrangement spaced apart from and coupled with an array of conical compound parabolic concentrators, each having an input end and an exit end in an enclosure with at least one transparent surface, the input end of each having a diameter less than a diameter of each Fresnel lens of said Fresnel lens arrangement;
    connecting an optical conduit to each exit end of the array of concentrators;
    collecting sunlight in the array of conical compound parabolic concentrators; and
    transporting the collected sunlight through the optical conduit to an interior portion of a structure where it can be integrated with electric lighting.

* * * * *